Oct. 26, 1943.          G. A. McDONOUGH          2,333,026
DUCT CONSTRUCTION
Filed June 4, 1942
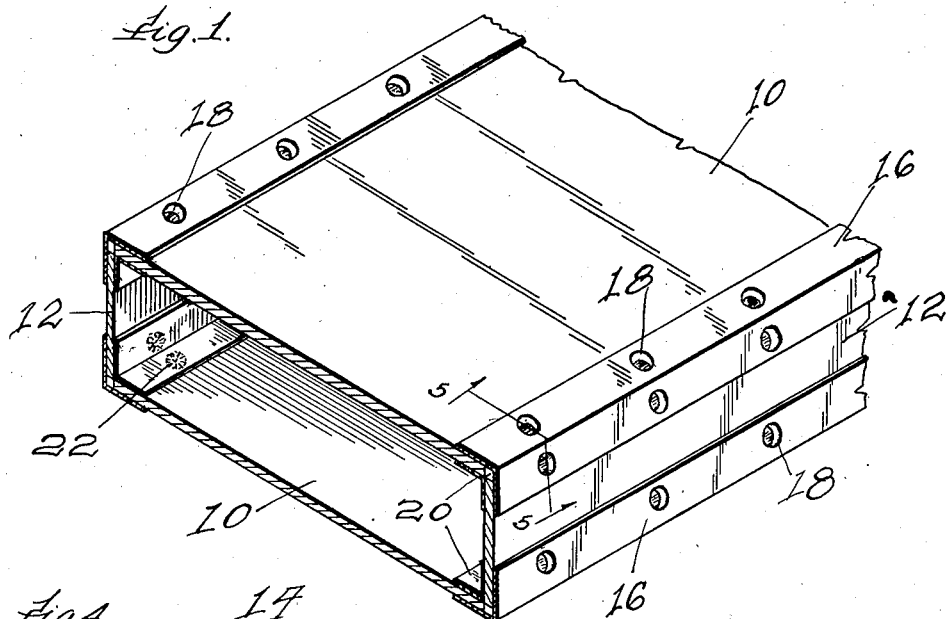
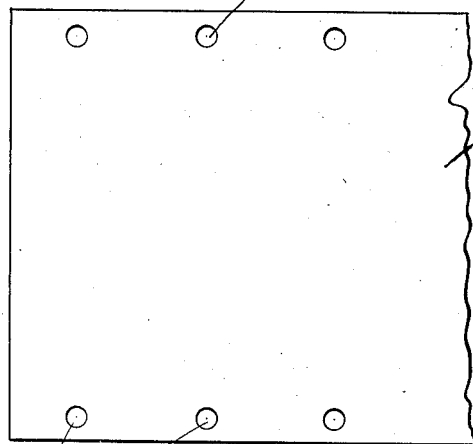
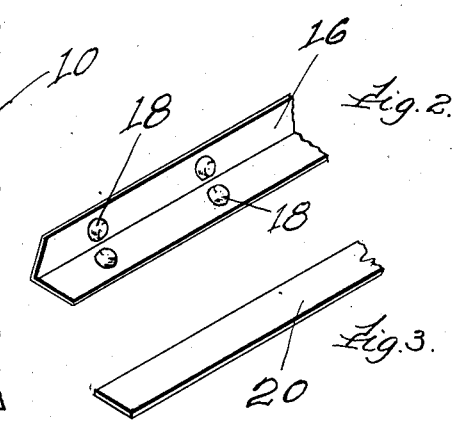
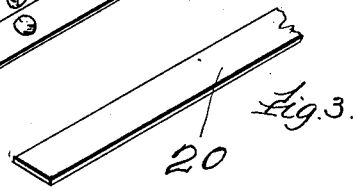
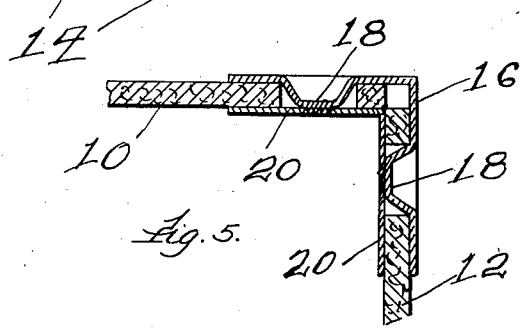
Inventor
George A. McDonough
by Albert Pike
Attorney Patented Oct. 26, 1943

2,333,026

UNITED STATES PATENT OFFICE 2,333,026

DUCT CONSTRUCTION

George A. McDonough, Chicago, Ill.

Application June 4, 1942, Serial No. 445,805

1 Claim. (Cl. 138—74)

This invention relates to an improved duct construction, and the present application constitutes an improvement over and an invention above that shown and described in my copending application for Letters Patent of the United States on Air duct construction, Serial No. 408,793, filed August 29, 1941.

One of the important objects of this invention is to provide an improved duct construction which, in addition to incorporating the novel and useful features of my air duct construction above mentioned, will further comprise additional ease of assembly and economy of manufacture.

An additional object of the present invention is to produce a duct construction which can be made of the simplest of materials and in a very simple fashion, but which, when completed, will embody a strong compact structure having all the desirabilities and advantages of my previous invention.

A further important object is the provision of a duct construction which can be readily assembled in a factory or other place remote from the place of installation and then very easily put into place, or which could, if necessary, be assembled at the place of installation, especially if the job were a large one.

Other and further important objects of the invention will be apparent from the disclosures in the accompanying drawing and following specification.

The invention, in a preferred form, is illustrated in the drawing and hereinafter more fully described.

In the drawing:

Figure 1 is a perspective view of the improved duct construction of this invention, showing the novel and useful features.

Figure 2 is a perspective view of one of the angle pieces used for edge structure.

Figure 3 shows one of the inside pieces used in the edge construction.

Figure 4 illustrates a portion of one of the side pieces, before assembly.

Figure 5 is a detail sectional view, taken on the line 5—5 of Figure 1.

As shown in the drawing:

The reference numeral 10 indicates generally one of the side pieces or wall portions of the improved duct construction of this invention. As shown in Figure 1, there are two of these and also two complementary or end pieces 12, which, when assembled, form the duct. These are composed of some material other than metal, such as fire-proofed wall-board, asbestos board, or the like, the object being the elimination of metal as much as possible.

The scarcity of metal at the present time and other advantages of the impregnated board over metal, such as sound-proofing and the like, make the avoidance of metal a distinct advantage.

As shown in Figure 4, these board pieces 10 and 12 are provided along their edges with series of openings 14, of a desired size and of a sufficient number.

Designed to support the assembled board pieces in assembled relationship are angle elements 16. These are of metal and are preferably rust-proofed in some fashion. Indentations 18 are formed in both faces of the angle elements 16, as best shown in Figures 2 and 5. These indentations are of such a size and are so spaced along the length of the angle elements that they conform to the size and spacing of the openings 14 in the wall pieces 10 and 12.

The angle pieces 16 are adapted to be fitted along the corners of the assembled boards 10 and 12, as will be evident, and the depressions or indentations 18 are fitted into the corresponding openings 14 in the wall elements.

In order to maintain the structure in desired assembled relationship, inner pieces 20 in the form of metal strips are fitted into the joined corners of the board elements, as best shown in Figures 1 and 5. The metal angles are then joined to the metal strips 20 by spot-welding or similar fashion. The draws or indentations 18 in the angle elements 16 are of sufficient size so that the electrodes of the usual spot-welder can be conveniently employed. The resulting weld is illustrated at 22 in Figure 1.

The draws or indentations can be made of any desired depth so as to accommodate wall material of different thicknesses, and if a relatively great thickness is required, corresponding draws or indentations may be made in the inner flat metal pieces 20, and spot-welding accomplished in the same manner.

It will be seen that herein is accomplished an improved duct construction which eliminated a good deal of the metal heretofore considered necessary in these devices. At present, these ducts are made entirely of metal and then covered with some insulating composition, such as asbestos or the like. In the present invention, practically the entire duct may be made of the insulating material, thereby eliminating much of the cost of both material and labor. A much more desirable duct also results in that the fire-proofing and sound-proofing qualities are enhanced, and in the installation, there is no possibility of accidentally omitting portions of the insulating material, as sometimes happens when a workman, either through carelessness or otherwise, does not adequately cover the metal of the ordinary duct. This is especially true in cases where the installations are made in difficultly accessible places, and the temptation to omit that portion of the covering is present. Obviously, the duct of this invention would not be completely operative if all of the board were not completely in position.

As will be evident from an inspection of Figure 5, the board pieces do not completely fill the space in the corner of the angle 16, but, if desired, this space can be filled in simply by moving the openings 14 back a corresponding distance in either of the adjoining boards 10 or 12.

I am aware that many changes may be made, and numerous details of construction varied throughout a wide range without departing from the principles of this invention, and I, therefore, do not purpose limiting the claim granted hereon otherwise than as necessitated by the prior art.

I claim as my invention:

A duct construction including wall pieces composed of insulating material and metal angles and strips joining the wall pieces together along the edges, the wall pieces having aligned openings along the edges thereof, indentations in the angles for fitting into the openings and spot-welds joining the strips to the angles at the openings.

GEORGE A. McDONOUGH.